United States Patent

[11] 3,629,517

[72] Inventor Marian Andreas Grimm
Boulder, Colo.
[21] Appl. No. 861,826
[22] Filed Sept. 29, 1969
[45] Patented Dec. 21, 1971
[73] Assignee International Business Machines Corporation
Armonk, N.Y.

[54] METHOD AND APPARATUS FOR MAGNETO-OPTICAL READING OF SUPERIMPOSED MAGNETIC RECORDINGS
10 Claims, 4 Drawing Figs.

[52] U.S. Cl. .......... 179/100.2CH, 340/173 LM, 340/174 YC, 340/174.1 M, 350/151, 350/162 SF

[51] Int. Cl. .......... G11b 11/10, G02f 1/18, G02b 5/18

[50] Field of Search .......... 179/100.2 CH, 100.2 CR, 100.2 MD; 340/174.1 M, 174 YC, 173 MA; 350/151, 162 SF

[56] References Cited

UNITED STATES PATENTS

| | | | |
|---|---|---|---|
| 2,929,670 | 3/1960 | Garrity | 179/100.2 MI |
| 3,229,273 | 1/1966 | Baaba | 340/174.1 M |
| 3,314,052 | 4/1967 | Lohmann | 340/173 MA |
| 3,408,143 | 10/1968 | Mueller | 350/162 SF |
| 3,425,770 | 2/1969 | Mueller | 340/173 MA |
| 3,480,933 | 11/1969 | Treves | 340/174.1 M |
| 3,508,215 | 4/1970 | Cohler et al. | 340/174 YC |

*Primary Examiner*—Bernard Konick
*Assistant Examiner*—Raymond F. Cardillo, Jr.
*Attorney*—Hanifin and Jancin

ABSTRACT: Superimposed tracks of magnetic recordings are read by use of a magneto-optic transducer. The recordings are on magnetic tape which is passed in close proximity to a magnetic thin-film layer coated to the reflecting side of a prism. The superimposed recordings on the tape are transferred in bulk to the magnetic thin film. Linearly polarized, monochromatic, collimated, substantially coherent light is passed into the prism and reflected from the back of the prism and out the other face of the prism. At the reflecting surface, the linearly polarized light experiences a rotation of its plane of polarization because of the magnetic field stored in the thin film. The rotation is in accordance with the well-known magneto-optic Kerr effect. The rotated light passes out of the prism and through an analyzer. The analyzer is adjusted to pass only that light which was given a particular rotation by the magnetic thin film. Because recorded tracks are closely spaced, the light emitted from the analyzer is similar to light passing out of a diffraction grating. This light passes through a lens which forms a Fraunhofer diffraction pattern of the light passed by the analyzer at the focal plane of the lens. A Fraunhofer diffraction pattern for each orientation of recorded tracks appears at the focal plane. A spatial filter is placed at the focal plane of the lens and rotated to align itself with the Fraunhofer pattern associated with one orientation of tracks. The spatial filter passes only the light of the pattern which the filter is aligned with. This light is imaged onto a detector system to read out the information recorded in tracks orientated to produce the filtered pattern.

INVENTOR
M. ANDREAS GRIMM
BY Homer L. Knearl
ATTORNEY

METHOD AND APPARATUS FOR MAGNETO-OPTICAL READING OF SUPERIMPOSED MAGNETIC RECORDINGS

BACKGROUND OF THE INVENTION

This invention relates to reading superimposed recordings from a magnetic storage medium. More particularly, the invention relates to selectively reading out superimposed, high-density recordings with a magneto-optic transducing system.

In the past, superimposed recordings have been read out by utilizing magnetic heads oriented at different angles. Each read head is oriented to read the information recorded at an angle that aligns with the read head gap. This technique has proved successful for low-recording densities. Crosstalk between tracks can be minimized by orienting the tracks at 90° to each other and keeping the track density relatively low, i.e., in the order of less than 20 tracks per inch.

When track density is increased by hundredfold up to 1,000 tracks per inch, the utilization of magnetic heads to read the tracks is not practical because of the small track width compared to the gap size of the magnetic head. To attempt to use a magnetic head to read superimposed recordings with a density of 1,000 tracks per inch approaches the impossible. The magnetic head would then not only see crosstalk from parallel tracks, but also crosstalk from the superimposed parallel tracks.

A relatively new technique for reading high-track densities is the use of magneto-optic transducers. These transducers utilize either the magneto-optic Kerr effect or Faraday effect. Magnetic information is detected by detecting the rotation of a linearly polarized light beam after it coacts with the information stored in the magnetic medium. However, the magneto-optic transducer has never been used to read superimposed recordings. The problems to be overcome are (1) achieving a good magneto-optic effect between the light and a plurality of superimposed magnetic recordings simultaneously and (2) selecting out a particular recording from superimposed recordings.

It is an object of this invention to read superimposed magnetic recordings recorded at very high densities of the order of 1,000 tracks per inch.

It is a further object of this invention to utilize magneto-optics to read superimposed magnetic recordings of high density.

It is, yet, a further object of this invention to selectively read out superimposed magnetic recordings with a magneto-optic transducing system.

SUMMARY OF THE INVENTION

In accordance with this invention, the above objects are accomplished by using a magneto-optic transducing system with a spatial filter. The filter is adjustable so that it may be positioned to select a given light pattern associated with one set of the superimposed magnetic recorded tracks.

In other words, the objects of the invention are accomplished by utilizing a magneto-optic transducing system to produce an optical pattern similar to that produced by a diffraction grating and, further, using, in combination with this apparatus, a lens to form the Fraunhofer diffraction pattern from the magneto-optic pattern, and, further, using a spatial filter placed at the focal plane of that lens to select the light to be passed to a light detecting system. The detecting system will then see the image of the magnetic recordings, whose tracks are oriented at an angle, to produce the Fraunhofer diffraction pattern whose light is passed by the spatial filter.

In addition, the magneto-optic transducing system can use as its transducing element an isotropic magnetic thin film coated on a glass plate or the reflecting surface of a prism. Because the magnetic thin film is isotropic, the superimposed recordings can be transferred to the film in bulk.

The great advantage of the invention is that a great quantity of data can now be stored on magnetic tape and still be read out. One thousand tracks per inch may be recorded, and another 1,000 tracks per inch may be superimposed thereon, and my magneto-optic transducing system is capable of reading out both pieces of information. Another advantage is the ease with which selection of superimposed recordings for readout may be made. Also, the quality of the selectivity is very high with very little crosstalk.

The foregoing and other objects, features and advantages of the invention will be apparent from the following, more particular description of a preferred embodiment of the invention, as illustrated in the accompanying drawings.

DESCRIPTION

Figure 1:
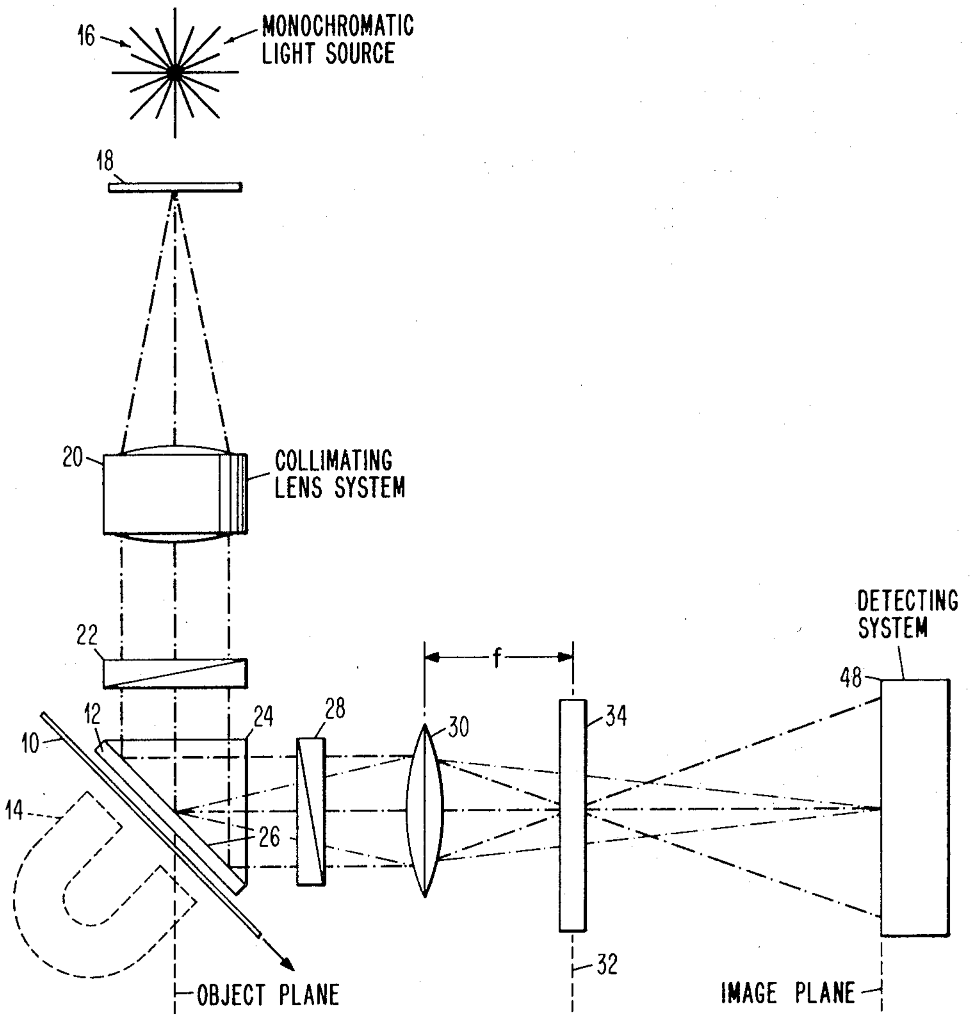
FIG. 1 is a schematic representation of a preferred embodiment of the inventive combination of a magneto-optic transducing system wherein stored information on a tape is transferred in bulk to the transducer, read out magneto-optically, and optically filtered to select one recording in a group of superimposed recordings.

Referring now to FIG. 1 in the preferred embodiment, magnetic tape 10 is shown positioned immediately adjacent magnetic thin film 12. Tape 10 contains two superimposed recordings. Each recording is oriented 90° to the other, and both are oriented 45° relative to the longitudinal direction of motion of the tape. As will be explained hereinafter, more than two superimposed recordings may be on the tape and be selectively read out by this invention. Also, any magnetic storage medium can be used instead of tape, as for example, magnetic disks and magnetic thin films.

The transfer of recordings from tape 10 to film 12 is in bulk. A bulk transfer is characterized as being a complete transfer of information so that thin film 12 contains an identical recorded pattern as that on tape 10. This is accomplished by bringing tape 10 into close proximity with magnetic thin film 12.

In transferring superimposed recordings onto another magnetic storage medium, one would expect that the actual transfer would be the resultant of the two superimposed recordings rather than the superimposed recordings themselves. As a significant part of this invention, it was discovered that a bulk transfer of the superimposed recordings can be achieved by using an isotropic magnetic thin film of proper coercivity. An isotropic thin film has no preferred direction of magnetization. The materials that might be used are cobalt and iron, or combinations of these elements, together, or each of them separate, with nickel. There may be other thin films which can be used; but the significant fact is that the thin film must be isotropic.

In addition, the coercivity of the thin film affects he ability to make the bulk transfer of superimposed recordings. If the coercivity is low (a magnetic field of less than say 20 oersteds), will change the direction of magnetization in the film the bulk transfer can be obtained by simply bringing magnetic tape 10 into contact with thin film 12. The field from the tape is, itself, enough to change the magnetic recordings in thin film 12.

On the other hand, if the coercivity of thin film 12 is high (a magnetic field greater than 10 oersteds is required to change the magnetic orientation of particles in the thin film), then it is necessary to provide a bias field to aid the transfer of magnetic superimposed recordings from tape 10 to film 12. Bias magnet 14 has been indicated schematically in phantom in FIG. 1. The field produced by the bias magnet should be substantially parallel to the plane of the thin film. This bias field is of sufficient strength so that when the information field, due to the magnetic recordings from tape 10, is added to it, there is enough magnetic field to change the magnetic orientation of particles in film 12. Of course, the amount of bias field necessary will depend upon the coercivity of thin film 12.

The magneto-optic transducing can take place directly on the original magnetic storage medium if desired. The storage medium should be highly light reflective to improve the efficiency of the transducing procedure. In the preferred embodiment here, a very highly reflective second storage medium (thin film 12) has been used, and the magnetic recordings are transferred in bulk from the original storage medium (tape 10) to the second storage medium (film 12).

With the superimposed recordings transferred in bulk to magnetic thin film 12, the next step in the procedure is to obtain an optical image of the superimposed recordings. This optical image is obtained by using the magneto-optic Kerr effect.

A source of monochromatic light 16 is acted on by a pinhole mask 18 and a collimating lens system 22 to produce a monochromatic, substantially plane wave. In other words, the light beams out of the collimating lens system should be parallel, of the same frequency, and substantially coherent. Of course, a laser could be substituted for light source 16, mask 18, and collimating lens system 20. The hardware shown in FIG. 1 was chosen because of its lower cost.

If the beam out of collimating lens system 20 is not monochromatic, or it is not substantially coherent, the invention is still operable to select out and read superimposed recordings. However, as the degree of coherence decreases, the performance of the inventive system degrades. Similarly, if the light is not monochromatic but instead contains other frequencies, the performance of the invention will degrade as the number of frequencies increases. The degrading of performance in accordance with these variables will be explained later with regard to the spatial filtering operation.

The monochromatic plane wave out of the collimating lens system is then passed through polarizer 22. The function of polarizer 22 is to linearly polarize the beam of light.

The light then enters prism 24 and is reflected off of face 26 inside the prism. Instead of prism 24, a transparent plate could be used; however, a prism improves the optical efficiency of the transducing operation. It is on face 26 of prism 24 that magnetic thin film 12 is attached. The magnetic field produced by the recordings in thin film 12 will act on the light reflected from face 26 in accordance with the magneto-optic Kerr effect. Alternatively, the magneto-optic Faraday effect could be used if there were no prism and the light was directed through thin film 12.

The plane of polarization of the incident beam, when reflected off of face 26 of prism 24, is rotated by the magnetic field of the recordings in thin film 12. A binary "1" recorded on the thin film would produce a magnetic field at face 26 of the prism which would cause the linearly polarized light to rotate a first direction. Conversely, a binary "0" recorded in thin film 12 would produce a magnetic field of the opposite direction at face 26 of prism 24. This opposite magnetic field causes the linearly polarized light to rotate in a direction opposite from the direction of the first rotation. Thus, the rotation of the polarized light reflected back out of prism 24 contains the magnetic information recorded in thin film 12. Analyzer 28 is a polarizing filter oriented to pass light beams rotated in a first direction and to block light beams rotated in the opposite direction.

The pattern of light rays emerging from analyzer 28 is the equivalent of light emitted from a diffraction grating when a monochromatic plane wave is incident on the other side of a grating. In this case, however, there are, in fact, two diffraction gratings oriented at 90° to each other. The tracks oriented at 90° to each other have produced the equivalent of two diffraction gradings oriented at 90° to each other.

The next step in the procedure is to select out one of the orientation of tracks so that the magnetic information stored in those tracks may be readout. The light passing out of analyzer 28 is collected by lens 30. The Fraunhofer diffraction pattern for a diffraction grating is the spatial frequency spectrum of the grating. The pattern appears at the focal plane of a lens used to collect the light emitted from the grating. Accordingly, at focal plane 32 of lens 30 the Fourier spectrum of each diffraction grating (in this case the magneto-optic representation of the tracks) will appear. At this focal plane 32, a rotatable slit mask has been positioned.

Figure 3:
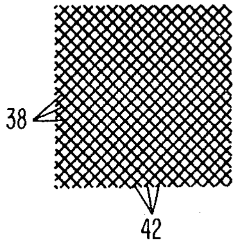
FIG. 3 shows the optical image of the superimposed recorded information as seen by the lens in FIG. 1.
Figure 2:
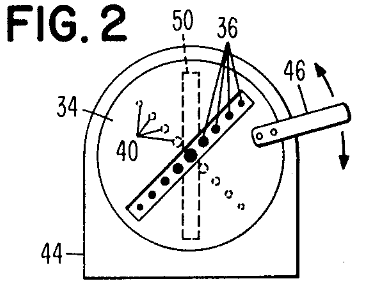
FIG. 2 shows the rotatable slit mask of FIG. 1 and the Fraunhofer diffraction pattern associated with each of the superimposed recordings.
Figure 4:
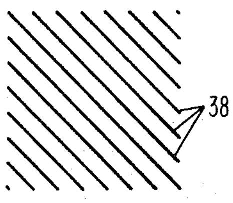
FIG. 4 shows the optical image seen by the detecting system after spatial filtering has occurred to select out the set of recorded tracks to be read.

In FIG. 2, the rotatable slit mask 34 and the Fraunhofer diffraction patterns are shown. The diffraction pattern for each orientation of magnetic tracks is a line of bright spots decreasing in intensity as they move away from the optical axis of the system. Fraunhofer diffraction pattern 36 is produced by the magneto-optic pattern for the set of tracks 38 in FIG. 3. Fraunhofer pattern 40 in FIG. 2 is the pattern produced by the magneto-optic image of tracks 42 in FIG. 3.

Slit mask 34 is rotatably mounted in bracket 44 and is provided with lever 46 to rotate the mask. If the slit in mask 34 is aligned with the Fraunhofer diffraction pattern 36, light beams associated with that pattern are passed by the mask to detecting system 48 in FIG. 1. The image that appears on the image plane of detecting system 48 is the magneto-optic representation of tracks 38. The image is also magnified due to lens 30. The magnification aids the detecting system in reading out information in the tracks.

If tracks 42 are to be imaged onto detecting system 48, then slit mask 34 in FIG. 2 is rotated until the slit aligns with Fraunhofer diffraction pattern 40. The light for this pattern is then passed by the mask to detecting system 48. Tracks 42, shown in FIG. 3, will appear on the image plane of detecting system 48. Shown in phantom in FIG. 2 is second slit 50 in mask 34. This slit may be positioned so that very little rotation of mask 34 is required before the second slit will align with Fraunhofer diffraction pattern 40.

Detecting system 48, in FIG. 1, may take on a variety of implementations. A piece of photographic film could simply be placed in the image plane for later analysis. Alternatively, a real-time detecting system might consist of an array of photocells or photodiodes, or a scanning television camera. The photocells, photodiodes, or the camera would be looking at bit positions in tracks focused onto the detecting system.

Of course, more than two superimposed recordings (for example, three sets of tracks with each set oriented at 60° to the adjacent sets) might be read out by the inventive apparatus. For a plurality of superimposed recordings, additional slits could be placed in mask 34, or a single-slit mask could be used. To selectively read out each superimposed recording, the mask would be rotated to align a slit with the Fraunhofer diffraction pattern for a given set of tracks.

The reason for the monochromatic light source and use of a plane wave relates to the spatial filtering apparatus consisting of lens 30 and slit mask 34. If a plane wave is used, a Fraunhofer diffraction pattern is produced by lens 30. If the light is not a plane wave, a smear of light will appear along the same line as the Fraunhofer diffraction pattern. Thus, each orientation of tracks would produce a smear of light at a different orientation at focal plane 32.

As the coherence of the light decreases and the wave becomes other than a plane wave, the light striking the center of the slit mask is no longer the DC component of the Fourier spectrum of the diffraction gratings. Instead, the light contains secondary components for each orientation of the superimposed gratings. As a result, the image appearing at the image plane of detecting system 48 is not clean, but instead it contains noise. The quality and clarity of the image appearing on the image plane degrades as the coherence of the light beam decreases.

Similarly, if the light source is not monochromatic, each of the different frequencies causes a distinct Fraunhofer diffraction pattern to appear along the same line at focal plane 32. Again, the tendency is to produce a smear of light rather than a clean Fraunhofer diffraction pattern. The result is that some light from one magneto-optic image of tracks is passed through the center of the slit mask while the slit mask is aligned to pass light for the other orientation of tracks. Again, the image produced on the image plane degrades. The amount of reduction in quality of the image depends upon the frequencies produced by the light source or the quality of an optical filter producing monochromatic light from a white light source.

The representation of the slit mask in FIG. 2 is shown merely as an example. The slit mask is shown herein as manually positioned. Of course, electromechanical means can be provided to rotate the mask to the desired positions to read out each orientation of magnetic tracks.

While the invention has been particularly shown and described with reference to a preferred embodiment thereof, it will be understood by those skilled in the art that various changes in form and details may be made therein without departing from the spirit and scope of the invention.

What is claimed is:

1. A magneto-optic transducing system for selectively reading out one of a plurality of superimposed magnetic recordings from a movable magnetic storage medium comprising:

means for generating a magneto-optic pattern of the magnetic superimposed recordings only if the storage medium carrying the recordings is in optical contact with the transducing system;

means for filtering the magneto-optic pattern so that, at any given time, the magneto-optic pattern from only one set of recordings in the plurality of superimposed recordings is selectively passed by said filtering means;

means for detecting the information in the set of recordings passed by said filtering means.

2. The magneto-optic transducing system of claim 1 and, in addition:

a storage medium permanently mounted in optical contact with the transducing system;

means for transferring the superimposed recordings in bulk from the movable magnetic storage medium to the storage medium permanently mounted in the transducing system.

3. The apparatus of claim 2 wherein the storage medium permanently mounted in the magneto-optic transducing system is an isotropic magnetic thin film.

4. The apparatus of claim 1 wherein the means for generating the magneto-optic pattern comprises:

a source of monochromatic light;

means for producing a substantially plane wave of monochromatic light from the light out of the light source;

means responsive to the monochromatic, substantially plane wave of light for generating a magneto-optic pattern of the superimposed recordings.

5. The apparatus of claim 4 wherein the means for filtering the magneto-optic pattern comprises:

a lens for collecting the light from said generating means so as to produce the Fraunhofer diffraction pattern at the focal plane of the lens for each set of recordings;

spatial filter means mounted at the focal plane of said lens for selectively filtering the Fraunhofer diffraction pattern from each set of recordings so that, at any given time, only the light due to the magneto-optic pattern of one of the superimposed recordings is passed by the spatial filter means.

6. The apparatus of claim 5 wherein said spatial filter means comprises a rotatably mounted slit mask whereby the pattern of light passed by the filter is selected by rotating the slit until it aligns with the Fraunhofer diffraction pattern for one of the set of recordings in the superimposed recordings.

7. A method for selectively reading out one of a plurality of superimposed recordings from a storage medium comprising the steps of:

generating a magneto-optic pattern of the superimposed recordings;

filtering the magneto-optic pattern whereby, at any given time, the magneto-optic pattern from only one set of recordings in the plurality of superimposed recordings is passed during the filtering operation;

detecting the information in the magneto-optic pattern passed during filtering.

8. The method of claim 7 and, in addition, the step of:

transferring in bulk the superimposed recordings from a first magnetic storage medium to a second storage medium prior to generating the magneto-optic pattern from the second storage medium.

9. The method of claim 7, wherein said step of generating the magneto-optic pattern comprises the steps of:

generating a monochromatic, substantially plane wave of light;

linearly polarizing the light;

reflecting the polarized plane wave of light off the storage medium whereupon the plane of polarization of the light is rotated;

analyzing the light reflected from the storage medium to detect the plane of polarization of the light so that a magneto-optic pattern of the superimposed recordings is produced.

10. The method of claim 7 wherein said step of filtering the magneto-optic pattern comprises the steps of:

collecting the light of the magneto-optic pattern to produce a plurality of Fraunhofer diffraction patterns, one diffraction pattern for each set of recordings;

spatial filtering the Fraunhofer diffraction patterns to selectively pass at any given time the light in one diffraction pattern so that the magneto-optic pattern for only one set of recordings is passed.

* * * * *